Patented May 27, 1924.

1,495,580

UNITED STATES PATENT OFFICE.

THOMAS A. EDISON, OF LLEWELLYN PARK, WEST ORANGE, NEW JERSEY.

METHOD OF PRODUCING CHLORINATED RUBBER.

No Drawing.    Application filed February 8, 1923.    Serial No. 617,849.

*To all whom it may concern:*

Be it known that I, THOMAS A. EDISON, a citizen of the United States and a resident of Llewellyn Park, West Orange, county of Essex, and State of New Jersey, have invented certain new and useful Improvements in Methods of Producing Chlorinated Rubber, of which the following is a description.

My invention relates to the method of producing chlorinated rubber and the principal object thereof is to provide an improved method whereby such rubber may be produced more economically than by the methods heretofore employed or suggested.

In producing chlorinated rubber in accordance with my improved method, preferably extremely thin sheets or strips of substantially pure rubber, such as sheets or strips of pale crêpe, are placed in a closed or air-tight chamber or vessel formed of a material such as glass or earthenware, which will not be attacked by chlorine, and perfectly dry chlorine gas is then introduced into the chamber in the presence of vapor of a highly chlorinated compound which is a solvent of rubber and which will not react with chlorine, preferably gaseous carbon tetrachloride. The rubber under the action of the gaseous carbon tetrachloride softens and swells and the chlorine gas reacts therewith to form a highly chlorinated rubber. The carbon tetrachloride vapor is passed continuously through the chamber or vessel in which the rubber is being treated, and this vapor after leaving the chamber, is condensed and freed from any chlorine gas, hydrochloric acid and water which may be present, after which it is again vaporized and passed through the chamber or vessel containing the rubber being chlorinated.

During the treatment of the rubber as described above, the chlorine replaces some of the hydrogen in the rubber and this replaced hydrogen combines with some of the excess chlorine to form hydrochloric acid, the latter, aside from the chlorinated rubber itself, being the principal result of the reaction of the chlorine and the rubber. When the rubber has been completely chlorinated, the same will be in the form of a soft, syrupy mass containing some hydrochloric acid. This mass is now removed from the chamber or vessel in which it was formed and the chlorinated rubber is precipitated in water. In effecting this step of the process, the soft syrupy mass is either added to hot water in a suitable container and the mixture violently agitated as by means of a stirrer; or such mass may be added to water and such mixture then violently agitated by a jet or jets of steam. This will emulsify the chlorinated rubber. The chlorinated rubber is now separated from the acidulated water as by screening or in a centrifuge; after which it is washed to remove all the hydrochloric acid and then dried at a low temperature.

During the chlorination of the rubber and also during the precipitating of the chlorinated rubber, as described, the temperature is maintained at a low point, never being allowed appreciably to exceed 212° Fahrenheit. This results in the obtaining of chlorinated rubber which is not at all damaged by heat.

It is especially to be noted that the process described does not involve the step of dissolving the crude rubber in a large quantity of liquid carbon tetrachloride or other liquid solvent. Accordingly, my process does not involve the losses and expense of recovering such a solvent.

The sheets of rubber subjected to the action of chlorine and carbon tetrachloride in a gaseous state, in accordance with the present invention, should preferably be extremely thin, as the carbon tetrachloride when in such gaseous state, will penetrate only a slight thickness of rubber.

Chlorinated rubber produced as described herein is adapted for various uses. For example, upon being properly mixed with a suitable solid solvent, such as naphthaline, it is adapted to be molded into articles of various forms under heat and pressure and is also capable of being rolled into sheets. The material so produced is especially adapted for use as a veneer or outer record receiving layer for disc phonograph records, and also in cylindrical form, for cylinder phonograph records.

The characteristics of the chlorinated rubber produced as described, such for example, as the hardness, toughness, flexibility and color thereof, may be varied greatly by regulating the amount of chlorine combined with the rubber in the chlorinating step, and also by adding to the chlorinated rubber various fillers such as wood flour, chalk, bentonite, etc.

Having now described my invention, what

I claim as new and desire to protect by Letters Patent is as follows:

1. The process which consists in subjecting rubber to the action of chlorine in the presence of a solvent for rubber which is in a gaseous state, substantially as described.

2. The process which consists in subjecting rubber to the action of chlorine in the presence of vapor of a chlorinated compound which is a solvent of rubber, substantially as described.

3. The process which consists in subjecting rubber to the action of chlorine in the presence of carbon tetrachloride in a gaseous state, substantially as described.

4. The process which consists in disposing thin sheets of rubber in a closed chamber and passing dry chlorine gas together with carbon tetrachloride in a gaseous state into such chamber, substantially as described.

5. The process of producing chlorinated rubber which consists in subjecting very thin sheets of rubber to chlorine in the presence of vapor of a chlorinated compound which is a solvent of rubber, substantially as described.

6. The process which consists in disposing rubber in a closed chamber, introducing dry chlorine gas into the chamber, passing vapor of a chlorinated compound which is a solvent of rubber through the chamber and condensing said vapor after it leaves the chamber, substantially as described.

7. The process which consists in disposing rubber in a closed chamber, introducing dry chlorine gas into the chamber, passing vapor of a chlorinated compound which is a solvent of rubber through the chamber, condensing said vapor after it leaves the chamber, volatilizing the condensed liquid and passing the vapor thus obtained through the chamber, substantially as described.

8. The process which consists in disposing rubber in a closed chamber, introducing chlorine gas into the chamber, passing vapor of a chlorinated compound which is a solvent of rubber through the chamber, condensing said vapor after it leaves the chamber, removing all hydrochloric acid, chlorine and water from the condensed liquid and then volatilizing the latter and passing the vapor thus obtained through the chamber, substantially as described.

9. The process which consists in subjecting rubber to the action of chlorine in the presence of vapor of a chlorinated compound which is a solvent of rubber, then precipitating the chlorinated rubber thus produced in water, substantially as described.

10. The process which consists in subjecting rubber to the action of chlorine in the presence of vapor of a chlorinated compound which is a solvent of rubber, precipitating the chlorinated rubber thus produced, and then washing the chlorinated rubber free from acid, substantially as described.

11. The process which consists in subjecting rubber to the action of chlorine in the presence of vapor of a chlorinated compound which is a solvent of rubber, precipitating the chlorinated rubber thus produced, and then washing the chlorinated rubber free from acid and drying the same, substantially as described.

This specification signed this 5th day of February 1923.

THOS. A. EDISON.